(12) United States Patent
Kato et al.

(10) Patent No.: US 9,307,197 B2
(45) Date of Patent: Apr. 5, 2016

(54) TRANSMISSION MANAGEMENT APPARATUS

(75) Inventors: Yoshinaga Kato, Kanagawa (JP); Taro Okuyama, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 99 days.

(21) Appl. No.: 13/989,665

(22) PCT Filed: Feb. 22, 2012

(86) PCT No.: PCT/JP2012/055011
§ 371 (c)(1),
(2), (4) Date: May 24, 2013

(87) PCT Pub. No.: WO2012/118105
PCT Pub. Date: Sep. 7, 2012

(65) Prior Publication Data
US 2013/0242034 A1    Sep. 19, 2013

(30) Foreign Application Priority Data

Feb. 28, 2011  (JP) .................................. 2011-042365
Oct. 27, 2011  (JP) .................................. 2011-236251

(51) Int. Cl.
*H04N 7/14*    (2006.01)
*H04N 7/15*    (2006.01)

(52) U.S. Cl.
CPC . *H04N 7/15* (2013.01); *H04N 7/152* (2013.01)

(58) Field of Classification Search
None
See application file for complete search history.

(56) References Cited

U.S. PATENT DOCUMENTS

| 5,402,418 A | 3/1995 | Shibata et al. |
| 5,604,738 A | 2/1997 | Shibata et al. |

(Continued)

FOREIGN PATENT DOCUMENTS

| JP | 6-217019 | 8/1994 |
| JP | 08-223550 | 8/1996 |

(Continued)

OTHER PUBLICATIONS

International Search Report issued Apr. 3, 2012, in PCT/JP2012/055011, filed Feb. 22, 2012.

(Continued)

*Primary Examiner* — Maria El-Zoobi
(74) *Attorney, Agent, or Firm* — Oblon, McClelland, Maier & Neustadt, L.L.P.

(57) ABSTRACT

A transmission management apparatus manages transmission states of a plurality of transmission terminals including a first transmission terminal and a second transmission terminal. The apparatus includes a terminal management table storage unit configured to store therein a terminal management table in which terminal information including an identifier and an identification name of each transmission terminal is managed; a receiving unit configured to receive a terminal information request signal from the first transmission terminal, the terminal information request signal indicating a request for information for identifying the second transmission terminal, the first and second transmission terminals being in transmission therebetween; a terminal state acquisition unit configured to acquire the information for identifying the second transmission terminal from the terminal management table in response to the terminal information request signal; and a transmitting unit configured to transmit the information acquired by the terminal state acquisition unit to the first transmission terminal.

7 Claims, 14 Drawing Sheets

(56) References Cited

U.S. PATENT DOCUMENTS

| | | | |
|---|---|---|---|
| 5,970,054 A | 10/1999 | Shibata et al. | |
| 2007/0100944 A1* | 5/2007 | Ford | H04L 12/581 709/206 |
| 2008/0002020 A1 | 1/2008 | Choi et al. | |
| 2010/0226546 A1* | 9/2010 | Tanaka | H04N 7/147 382/118 |
| 2012/0185685 A1* | 7/2012 | Volmat | G06F 21/572 713/2 |
| 2013/0117472 A1* | 5/2013 | Sexton | G06Q 30/0639 710/15 |

FOREIGN PATENT DOCUMENTS

| | | |
|---|---|---|
| JP | 09-200723 | 7/1997 |
| JP | 10-164541 | 6/1998 |
| JP | 2001-188740 | 7/2001 |
| JP | 3308563 | 5/2002 |
| JP | 2004-080349 | 3/2004 |
| JP | 2006-005590 | 1/2006 |
| JP | 2012-075073 | 4/2012 |

OTHER PUBLICATIONS

Niimi, Yasuhisa. Speech Recognition. Japan. Kyoritsu Publishing, Co. 1979. pp. 68 to 72.

Yasuhisa Niimi, "Speech Recognition", Japan, Kyoritsu Publishing, Co., 1979, 9 pages (English Translation of the Relevant Part only).

Office Action issued Jul. 7, 2015 in Japanese Patent Application No. 2013-141296.

European Search Report mailed Sep. 25, 2015 in Patent Application No. 12751848.8.

* cited by examiner

FIG.3
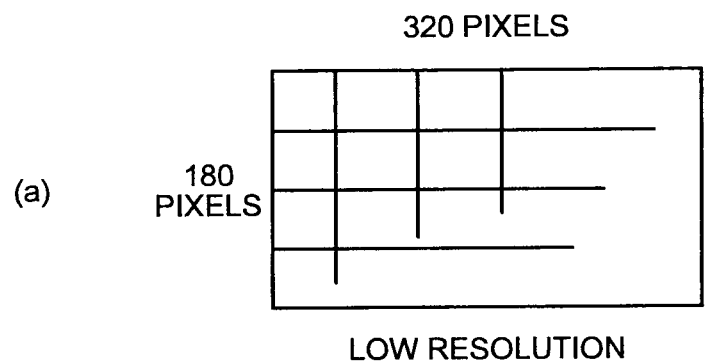
(a) LOW RESOLUTION
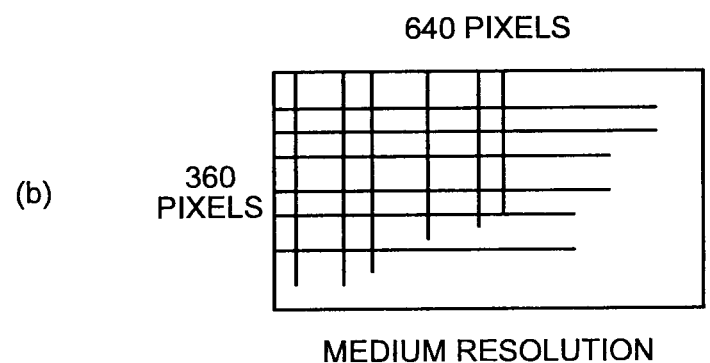
(b) MEDIUM RESOLUTION
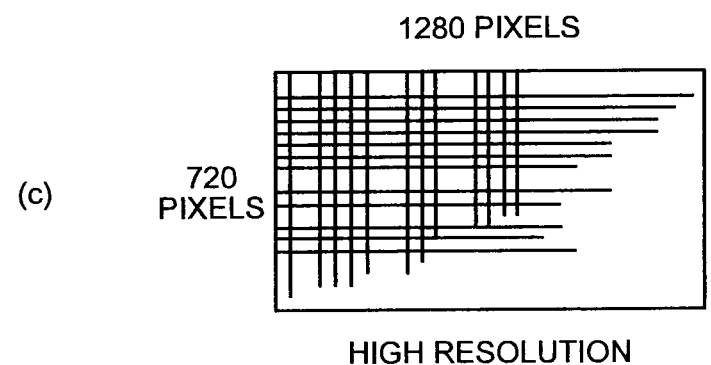
(c) HIGH RESOLUTION

| TERMINAL ID | PASSWORD |
|---|---|
| 01aa | aaaa |
| 01ab | abab |
| 01ba | baba |
| ... | ... |

FIG.9

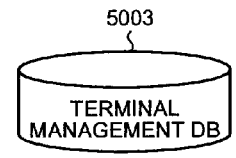

| TERMINAL ID | TERMINAL NAME | OPERATION STATE | RECEIVING DATE | IP ADDRESS OF TERMINAL |
|---|---|---|---|---|
| 01aa | AA TERMINAL, TOKYO BUSINESS OFFICE, JAPAN | ONLINE (TRANSMISSION IS ENABLED) | 2009.11.10. 13:40 | 1.2.1.3 |
| 01ab | AB TERMINAL, TOKYO BUSINESS OFFICE, JAPAN | OFFLINE | 2009.11.09. 12:00 | 1.2.1.4 |
| ... | ... | ... | ... | ... |
| 01ba | BA TERMINAL, OSAKA BUSINESS OFFICE, JAPAN | ONLINE (TRANSMISSION IS ENABLED) | 2009.11.10. 13:45 | 1.2.2.3 |
| 01bb | BB TERMINAL, OSAKA BUSINESS OFFICE, JAPAN | ONLINE (TRANSMISSION IS ENABLED) | 2009.11.10. 13:50 | 1.2.2.4 |
| ... | ... | ... | ... | ... |
| 01ca | CA TERMINAL, NEW YORK BUSINESS OFFICE, USA | OFFLINE | 2009.11.10. 12:45 | 1.3.1.3 |
| 01cb | CB TERMINAL, NEW YORK BUSINESS OFFICE, USA | ONLINE (IN TRANSMISSION) | 2009.11.10. 13:55 | 1.3.1.4 |
| ... | ... | ... | ... | ... |
| 01da | DA TERMINAL, WASHINGTON BUSINESS OFFICE, USA | OFFLINE | 2009.11.08. 12:45 | 1.3.2.3 |
| 01db | DB TERMINAL, WASHINGTON BUSINESS OFFICE, USA | ONLINE (IN TRANSMISSION) | 2009.11.10. 12:45 | 1.3.2.4 |
| ... | ... | ... | ... | ... |

FIG.10

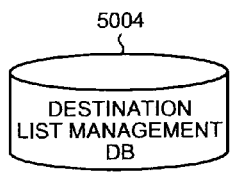

| REQUEST SOURCE TERMINAL ID | DESTINATION TERMINAL ID |
|---|---|
| 01aa | 01ab, 01ba, 01db |
| 01ab | 01aa, 01ca, 01cb |
| 01ba | 01aa, 01ab, 01ca, 01cb, 01da, 01db |
| ... | ... |
| 01db | 01aa, 01ab, 01ba, ···, 01da, 01ca, 01cb, ···, 01da |

TRANSMISSION MANAGEMENT APPARATUS

TECHNICAL FIELD

The present invention relates to a transmission management apparatus, for example, to a transmission management apparatus that manages transmission states of transmission terminals used in a remote conference system with which a remote conference is held through a network.

BACKGROUND ART

Remote conference systems realize situations similar to actual conferences as follows. Images and sounds are collected by imaging attendees and collecting utterances of the attendees in conference rooms where remote conferences are held. The collected images and sounds are converted into digital data and transmitted by transmission terminals on one side to other transmission terminals on the other parties' side. The images are displayed on displays such as video screens and the sounds are output from speakers in conference rooms on the other parties' side.

In an example of such remote conference systems, a remote conference can be realized among a plurality of sites by a relaying apparatus that is coupled to all of the transmission terminals attending the conference and controls delivery of image data and sound data to each transmission terminal.

Generally, in a remote conference held among sites, a display screen of the transmission terminal is divided into the number of transmission terminals attending the conference and images transmitted from other transmission terminals are displayed in the divided areas on the display screen so as to know who is attending the conference through other transmission terminals during the conference (e.g., refer to Japanese Patent No. 3308563).

Such a conventional technique, however, has a problem in that users who use the respective transmission terminals cannot grasp which transmission terminal is attending the conference when the number of transmission terminals attending the conference increases because the division number of the display screen is increased and thus a display area for displaying an image transmitted from each transmission terminal is reduced.

Therefore, there is a need for a transmission management apparatus that enables users who use respective transmission terminals to grasp which transmission terminal is attending a conference regardless of the number of transmission terminals attending the conference.

DISCLOSURE OF INVENTION

It is an object of the present invention to at least partially solve the problems in the conventional technology.

According to an embodiment, there is provided a transmission management apparatus for managing transmission states of a plurality of transmission terminals including a first transmission terminal and a second transmission terminal. The transmission management apparatus includes a terminal management table storage unit configured to store therein a terminal management table in which terminal information including an identifier and an identification name of each of the transmission terminals is managed; a receiving unit configured to receive a terminal information request signal from the first transmission terminal, the terminal information request signal indicating a request for information for identifying the second transmission terminal, the first transmission terminal and the second transmission terminal being in transmission therebetween; a terminal state acquisition unit configured to acquire the information for identifying the second transmission terminal from the terminal management table in response to the terminal information request signal; and a transmitting unit configured to transmit the information acquired by the terminal state acquisition unit to the first transmission terminal.

According to another embodiment, there is provided a transmission terminal that includes a transmitting unit configured to transmit a terminal information request signal to a transmission management apparatus for managing transmission states of a plurality of transmission terminals through a network, the terminal information request signal indicating a request for information for identifying at least one of the transmission terminals, the transmission terminal and the at least one of the transmission terminals being in transmission therebetween; a receiving unit configured to receive the information that is transmitted from the transmission management apparatus in response to the terminal information request signal; and a display control unit configured to cause a display unit to display the information received by the receiving unit.

According to still another embodiment, there is provided a transmission system that includes a plurality of transmission terminals each according to the transmission terminal according to the above embodiment; and the transmission management apparatus according to the above embodiment.

According to still another embodiment, there is provided a transmission management method for managing transmission states of a plurality of transmission terminals including a first transmission terminal and a second transmission terminal using a transmission management apparatus. The transmission management method includes receiving a terminal information request signal from the first transmission terminal, the terminal information request signal indicating a request for information for identifying the second transmission terminal, the first transmission terminal and the second transmission terminal being in transmission therebetween; acquiring the information for identifying the second transmission terminal from a terminal management table in which terminal information including an identifier and an identification name of each of the transmission terminals is managed, in response to the terminal information request signal, the terminal management table being stored in a recording medium; and transmitting the acquired information to the first transmission terminal.

According to still another embodiment, there is provided a transmission terminal control method using a transmission terminal. The transmission terminal control method includes transmitting a terminal information request signal to a transmission management apparatus for managing transmission states of a plurality of transmission terminals through a network, the terminal information request signal indicating a request for information for identifying at least one of the transmission terminals, the transmission terminal and the at least one of the transmission terminals being in transmission therebetween; receiving the information that is transmitted from the transmission management apparatus in response to the terminal information request signal; and causing a display unit to display the received information.

According to still another embodiment, there is provided a computer program product that includes a non-transitory computer readable medium including programmed instructions, wherein the instructions cause a computer to execute any one of the method according to the above embodiment.

The above and other objects, features, advantages and technical and industrial significance of this invention will be

BRIEF DESCRIPTION OF DRAWINGS

FIG. 3 illustrates image quality of the image data;

FIG. 9 is a conceptual view of a terminal management table;

FIG. 10 is a conceptual view of a destination list management table;

BEST MODE FOR CARRYING OUT THE INVENTION

An embodiment of the present invention will be described below with reference to the accompanying drawings.

<<Overall Structure of Embodiment>>

Figure 1:
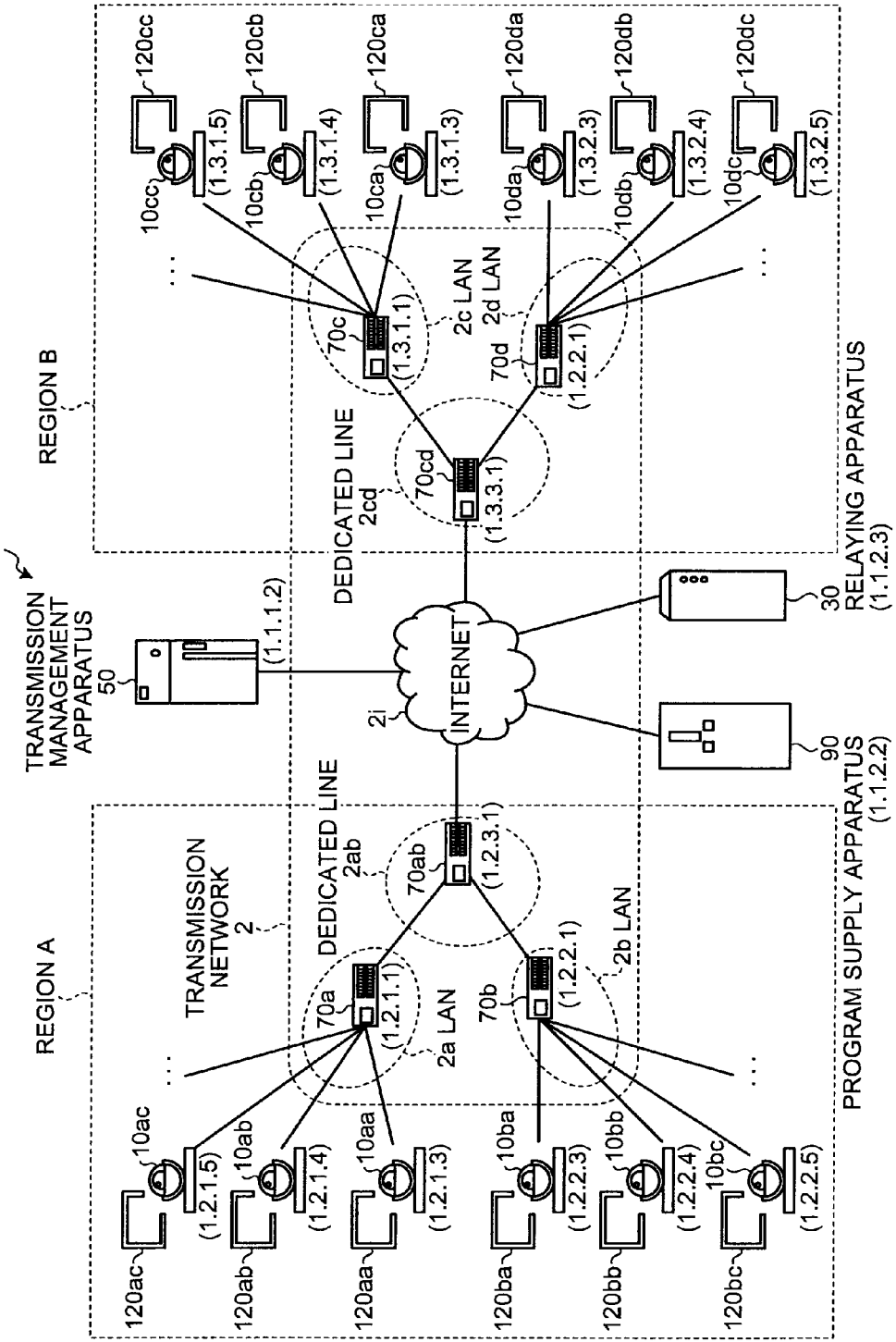
FIG. 1 is a schematic illustrating a structure of a transmission system.
Figure 2:
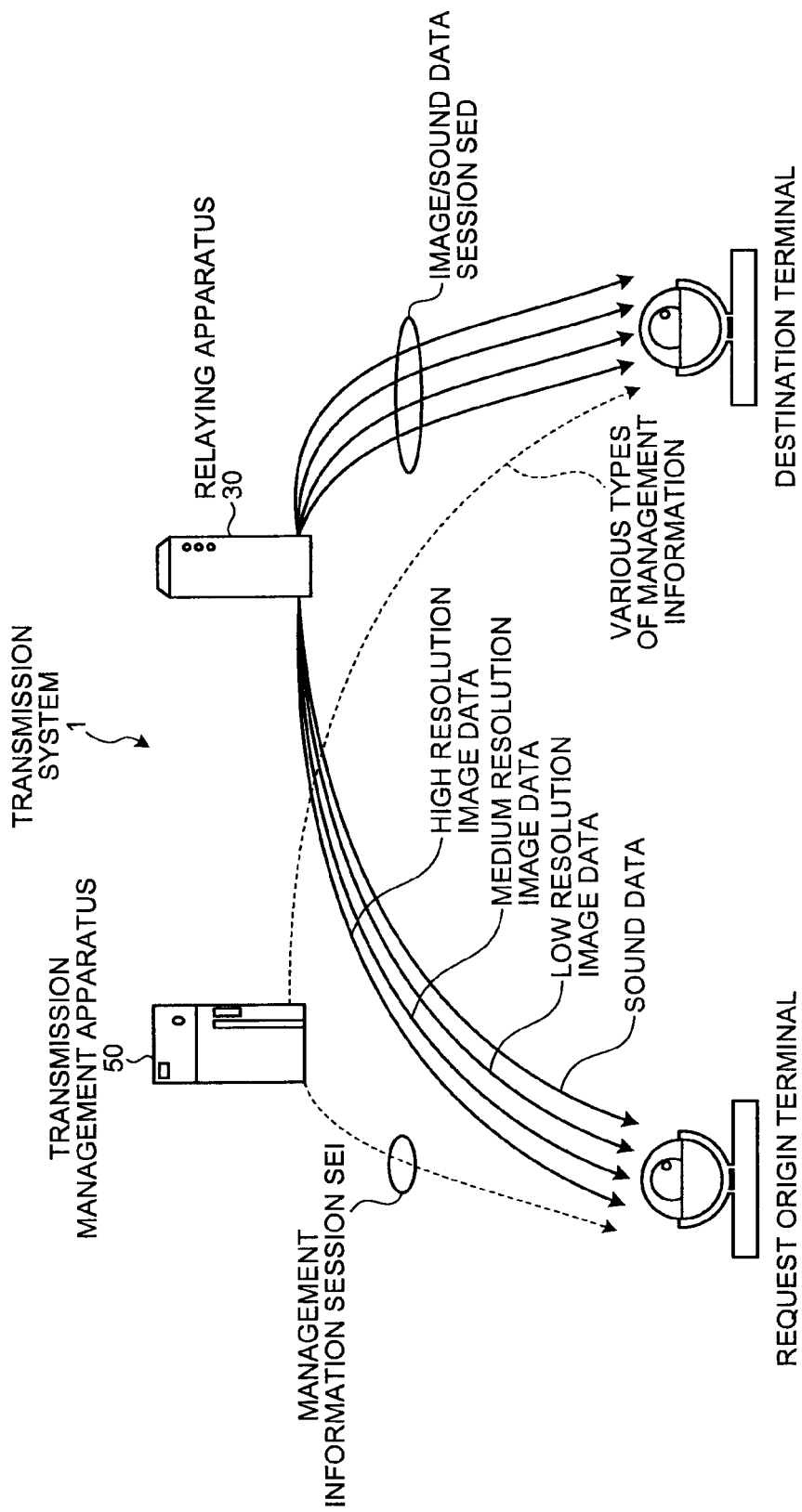
FIG. 2 is a conceptual view illustrating a state of transmitting and receiving of image data, sound data, and various types of management information in the transmission system.

FIG. 1 is a schematic of a transmission system 1 according to the embodiment. FIG. 2 is a conceptual view illustrating a state of transmitting and receiving of image data, sound data, and various types of management information in the transmission system 1. FIG. 3 illustrates image quality of the image data.

The transmission system includes a data supply system in which content data is transmitted from a transmission terminal to a plurality of transmission terminals through a transmission management apparatus in one direction and a communication system in which information and feelings, for example, are mutually transmitted among the transmission terminals through the transmission management apparatus. The communication system is a system for transmitting information and feelings mutually between a plurality of communication terminals (corresponding to the "transmission terminals") through a communication management apparatus (corresponding to the "transmission management apparatus"). Examples of the communication system include a video conference system and a video telephone system.

In the embodiment, the transmission system, the transmission management apparatus, and the transmission terminal are described on the assumption of the video conference system as an example of the communication system, a video conference management apparatus as an example of the communication management apparatus, and a video conference terminal as an example of the communication terminal. That is, the transmission terminal and the transmission management apparatus are applicable to not only the video conference system but also the communication system or a data transmission system.

As illustrated in FIG. 1, the transmission system 1 includes a plurality of transmission terminals 10aa, 10ab, . . . , displays 120aa, 120ab, . . . , for the respective transmission terminals 10aa, 10ab, . . . , a relaying apparatus 30, a transmission management apparatus 50, and a program supply apparatus 90. The transmission terminals 10aa, 10ab, . . . , perform transmission by transmitting and receiving content data, such as image data and sound data.

In the following descriptions, an arbitrary transmission terminal among the transmission terminals 10aa, 10ab, . . . , is expressed as a "transmission terminal 10", and an arbitrary display among the displays 120aa, 120ab, . . . , is expressed as a "display 120". In addition, one of the transmission terminals 10 that requests a start of a video conference as a request source is expressed as a "request source terminal" and another transmission terminal 10 that is a destination of the request is expressed as a "destination terminal".

As illustrated in FIG. 2, in the transmission system 1, a management information session SEI for transmitting and receiving various types of management information is established between the request source terminal and the destination terminal through the transmission management apparatus 50.

Between the transmission terminals 10 with the management information session SEI established, four sessions are established for transmitting and receiving four pieces of high resolution image data, medium resolution image data, low resolution image data, and sound data through the relaying apparatus 30. In the embodiment, the four sessions are collectively expressed as an "image/sound data session SED".

The image data in the embodiment is scalably encoded. For example, image data in the embodiment includes low resolution image data that is composed of 320 pixels horizontally and 180 pixels vertically as illustrated in (a) of FIG. 3 and serves as a base image, medium resolution image data composed of 640 pixels horizontally and 360 pixels vertically as illustrated in (b) of FIG. 3, and high resolution image data composed of 1280 pixels horizontally and 720 pixels vertically as illustrated in (c) of FIG. 3.

When a bandwidth through which image data is transmitted is narrow, only the low resolution image data serving as the base image is transmitted and the transmission terminal 10 on a receiving side can display only a low quality image in accordance with the transmitted low resolution image data.

When the bandwidth through which image data is transmitted is relatively wide, the low resolution image data serving as the base image and the medium resolution image data are transmitted and the transmission terminal 10 on the receiving side can display a medium quality image in accordance with the transmitted low resolution image data and medium resolution image data.

When the bandwidth through which image data is transmitted is very wide, the low resolution image data serving as the base image, the medium resolution image data, and the high resolution image data are transmitted and the transmission terminal 10 on the receiving side can display a high quality image in accordance with the transmitted low resolution image data, medium resolution image data, and high resolution image data.

In FIG. 1, the relaying apparatus 30 relays content data among the transmission terminals 10. The transmission management apparatus 50 performs login authentication of the transmission terminal 10 and manages a transmission state of the transmission terminal 10, a destination list, and a transmission state of the relaying apparatus 30, for example, in an integrated fashion. Images represented by the image data may be moving images or still images, or both moving and still images.

A plurality of routers 70a, 70b, 70c, 70d, 70ab, and 70cd select optimal routes for image data and sound data. In the following descriptions, an arbitrary router among the routers 70a, 70b, 70c, 70d, 70ab, and 70cd is expressed as a "router 70".

The program supply apparatus 90 includes an HD (Hard Disk) 204 (refer to FIG. 6), which is described later. A transmission terminal control program enabling the transmission terminal 10 to have various functions is stored in the HD 204. The program supply apparatus 90 can transmit the transmission terminal control program to the transmission terminal 10.

In addition, the program supply apparatus 90 stores a relaying apparatus program enabling the relaying apparatus 30 to have various functions in the HD 204 and can transmit the relaying apparatus program to the relaying apparatus 30.

Furthermore, the program supply apparatus 90 also stores a transmission management program enabling the transmission management apparatus 50 to have various functions in the HD 204 and can transmit the transmission management program to the transmission management apparatus 50.

The transmission terminals 10aa, 10ab, 10ac, . . . , and the router 70a are coupled to each other with a LAN 2a so as to enable transmission among them. Transmission terminals 10ba, 10bb, 10bc, . . . , and the router 70b are coupled to each other with a LAN 2b so as to enable transmission among them.

The LANs 2a and 2b are coupled to each other with a dedicated line 2ab including the router 70ab so as to enable transmission among them, and disposed in a predetermined region A. For example, the region A is Japan and the LAN 2a is disposed in a business office in Tokyo while the LAN 2b is disposed in a business office in Osaka.

Transmission terminals 10ca, 10cb, 10cc, . . . , and the router 70c are coupled to each other with a LAN 2c so as to enable transmission among them. Transmission terminals 10da, 10db, 10dc, . . . , and the router 70d are coupled to each other with a LAN 2d so as to enable transmission among them.

The LANs 2c and 2d are coupled to each other with a dedicated line 2cd including the router 70cd so as to enable transmission among them, and disposed in a predetermined region B. For example, the region B is the United States of America and the LAN 2c is disposed in a business office in New York while the LAN 2d is disposed in a business office in Washington, D.C. The regions A and B are coupled to each other with the routers 70ab and 70cd through the Internet 2i so as to enable mutual transmission.

The relaying apparatus 30, the transmission management apparatus 50, and the program supply apparatus 90 are coupled to each transmission terminal 10 through the Internet 2i so as to enable the apparatuses to perform transmission to each transmission terminal 10. The relaying apparatus 30, the transmission management apparatus 50, and the program supply apparatus 90 may be disposed in the region A or the region B, or in any region other than the regions A and B.

In the embodiment, a transmission network 2 of the embodiment includes the LANs 2a and 2b, the dedicated lines 2ab and 2cd, the Internet 2i, and the LANs 2c and 2d. The transmission network 2 may include a unit in which transmission is performed wirelessly such as wireless fidelity (Wi-Fi, registered trademark) or Bluetooth (registered trademark) besides the wired transmission.

In FIG. 1, four numbers indicated under each transmission terminal 10, the relaying apparatus 30, the transmission management apparatus 50, each router 70, and the program supply apparatus 90 simply represent commonly used IP addresses in IPv4. For example, the IP address of the transmission terminal 10aa is "1.2.1.3". IPv6 may be also used instead of IPv4. However, the explanation is made by using IPv4 for simple explanation.

Each transmission terminal 10 may be used in a video conference held in the same room, or in a video conference held between an outdoor site and an indoor site or among the outdoor sites, in addition to a video conference held among a plurality of business offices and a video conference held among different rooms in the same business office. When each transmission terminal 10 is used at an outdoor site, transmission is performed wirelessly such as a cellular phone transmission network.

<<Hardware Structure of Embodiment>>

Figure 4:
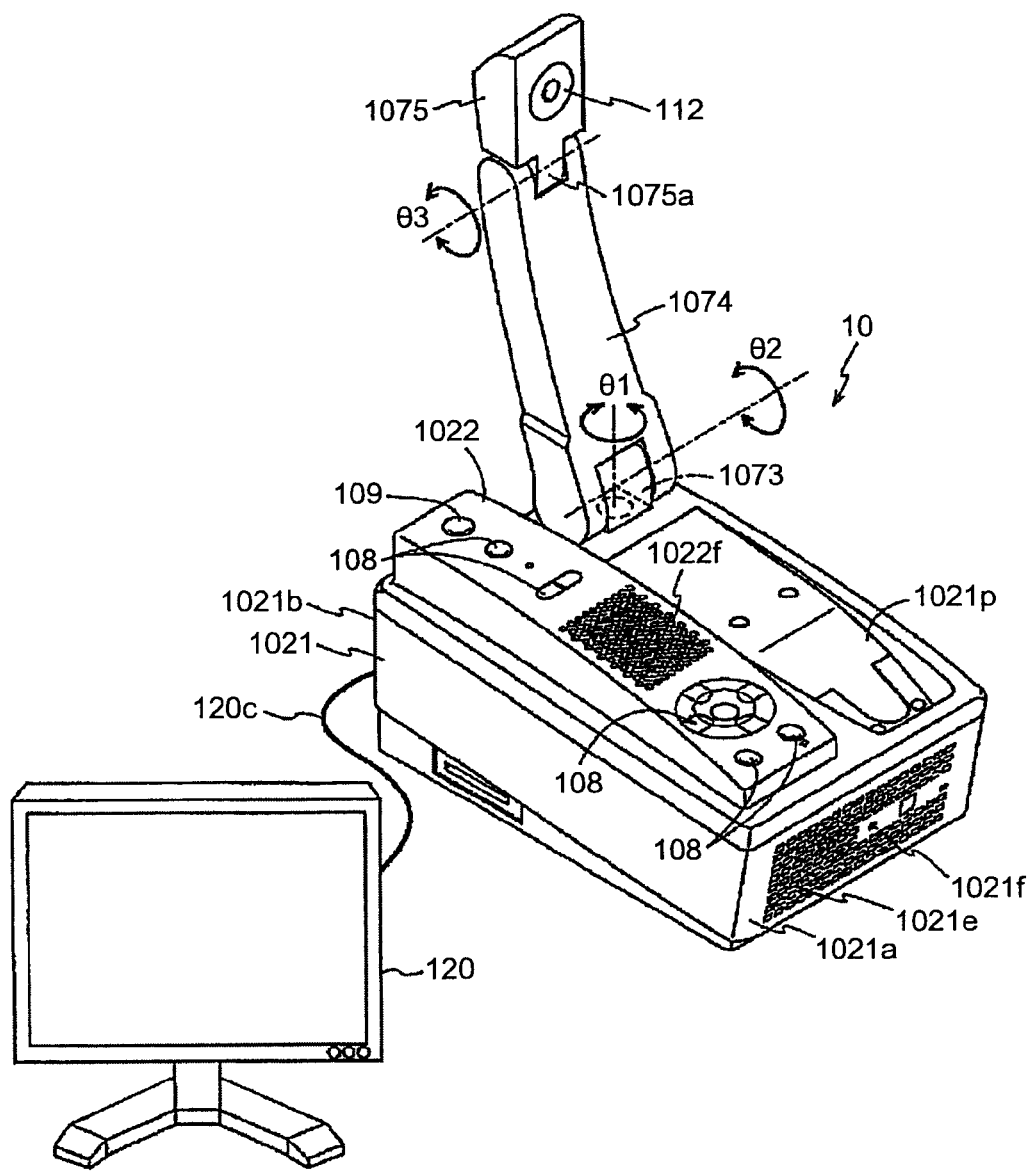
FIG. 4 is an external view of a transmission terminal.

As illustrated in FIG. 4, the transmission terminal 10 includes a housing 1021, an arm 1074, and a camera housing 1075. A front sidewall 1021a of the housing 1021 has a plurality of air intake holes 1021e on almost the entire surface thereof. A rear sidewall 1021b of the housing 1021 has a plurality of air exhaust holes (not illustrated) on almost the entire area thereof. As a result, the transmission terminal 10 can intake external air at the front of the transmission terminal 10 through the air intake holes 1021e and exhaust air toward the rear of the transmission terminal 10 through the air exhaust holes by driving a cooling fan included in the housing 1021. The front sidewall 1021a has a sound-collecting hole 1021f at the central part thereof. The sound-collecting hole 1021f enables a built-in microphone 114 (refer to FIG. 5), which is described later, to collect sounds such as voices, other sounds, and noises.

The housing 1021 has an operation panel 1022 on the left side when viewed from the front thereof. The operation panel 1022 is provided with operation buttons 108, a power switch 109, and a plurality of sound output holes 1022f through which sounds output from a built-in speaker 115 (refer to FIG. 5), which is described later, pass. In addition, the housing 1021 has a housing unit 1021p formed in a recess so as to house the arm 1074 and the camera housing 1075, on the right side when viewed from the front thereof.

The arm 1074 is mounted on the housing 1021 with a torque hinge 1073. For example, the arm 1074 is mounted so as to be rotatable in the up-down and left-right directions within a range of a pan angle $\theta 1$ of ±180 degrees and within a range of a tilt angle $\theta 2$ of 90 degrees when the angle of the arm 1074 at the front is 0 degrees with respect to the housing 1021. When the tilt angle $\theta 2$ is approximately 45 degrees, a click feeling is generated.

The camera housing 1075 includes a built-in camera 112 (refer to FIG. 5), which is described later. The camera 112 can be used to image a user and a room, for example. The camera housing 1075 has a torque hinge 1075a.

The camera housing 1075 is mounted on the arm 1074 with the torque hinge 1075a. For example, the camera housing 1075 is mounted on the arm 1074 so as to be rotatable within a tilt angle θ3 of approximately 100 degrees toward the front side of the transmission terminal 10 and approximately 90 degrees toward the rear side of the transmission terminal 10 when the angle of 0 degrees is defined as a state in which the camera housing 1075 and the arm 1074 are arranged in a straight line.

Figure 5:
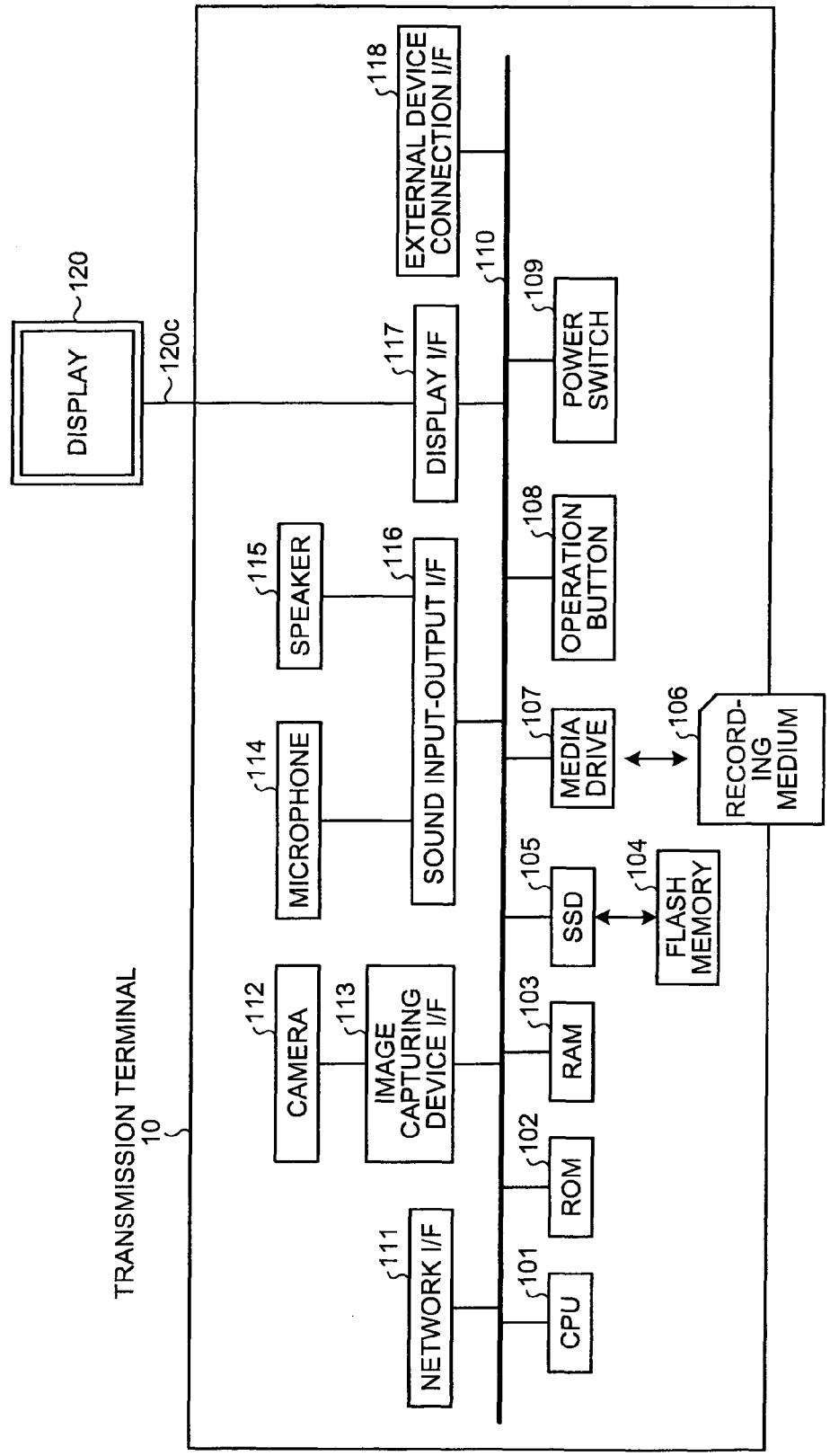
FIG. 5 is a schematic illustrating a hardware structure of the transmission terminal.

As illustrated in FIG. 5, the transmission terminal 10 includes a central processing unit (CPU) 101 that controls overall operation of the transmission terminal 10, a read only memory (ROM) 102 that stores therein a program used to drive the CPU 101 such as an initial program loader (IPL), a random access memory (RAM) 103 used as a working area of the CPU 101, a flash memory 104 that stores therein various types of data such as the transmission terminal control program, the image data, and the sound data, a solid state drive (SSD) 105 that controls reading of various types of data from or writing various types of data into the flash memory 104 under the control of the CPU 101, a media drive 107 that controls reading of data from or writing (storing) of data into a recording medium 106 such as a flash memory, the operation button 108 operated when a destination of the transmission terminal 10 is selected, for example, the power switch 109 that switches ON and OFF of a power supply of the transmission terminal 10, and a network interface (I/F) 111 that performs data transmission by utilizing the transmission network 2.

The transmission terminal 10 further includes the built-in camera 112 that images a subject and acquires the image data under the control of the CPU 101, an image capturing device I/F 113 that controls driving of the camera 112, the microphone 114 that serves as a built-in sound collector receiving sounds, the built-in speaker 115 that outputs sounds, a sound input-output I/F 116 that processes input and output of a sound signal between the microphone 114 and the speaker 115 under the control of the CPU 101, a display I/F 117 that transmits image data to the display 120 externally mounted under the control of the CPU 101, an external device connection I/F 118 that connects various external devices, and a bus line 110 that electrically connects the above-described components, such as an address bus or a data bus.

The display 120 is a display device including liquid crystal or organic EL by which images of subjects and operation icons, for example, are displayed. The display 120 is coupled to the display I/F 117 with a cable 120c. The cable 120c may be an analog RGB (VGA) signal cable, a component video cable, an HDMI high-definition multimedia interface (HDMI) signal cable, or a digital video interactive (DVI) signal cable.

The camera 112 includes a lens and a solid state image capturing device that converts light into charges so as to generate an electrically available image of a subject. As the solid state image capturing device, a CMOS or a CCD is used, for example.

The external device connection I/F 118 can couple an external device such as an external camera, an external microphone, or an external speaker with a universal serial bus (USB) cable, for example.

When an external camera is coupled to the external device connection I/F 118, the CPU 101 drives the external camera prior to the built-in camera 112. When an external microphone or an external speaker is coupled to the external device connection I/F 118, the CPU 101 drives the external microphone and the external speaker prior to the built-in microphone 114 and the built-in speaker 115.

The recording medium 106 is attachable to and detachable from the transmission terminal 10. An electrically erasable and programmable ROM (EEPROM) may be used for the transmission terminal 10, for example, as a non-volatile memory from which data is read or into which data is written under the control of the CPU 101, instead of the flash memory 104.

The transmission terminal control program may be recorded into a computer readable recording medium such as the recording medium 106 in an installable format or an executable format and distributed. The transmission terminal control program may be stored in the ROM 102 instead of the flash memory 104.

Figure 6:
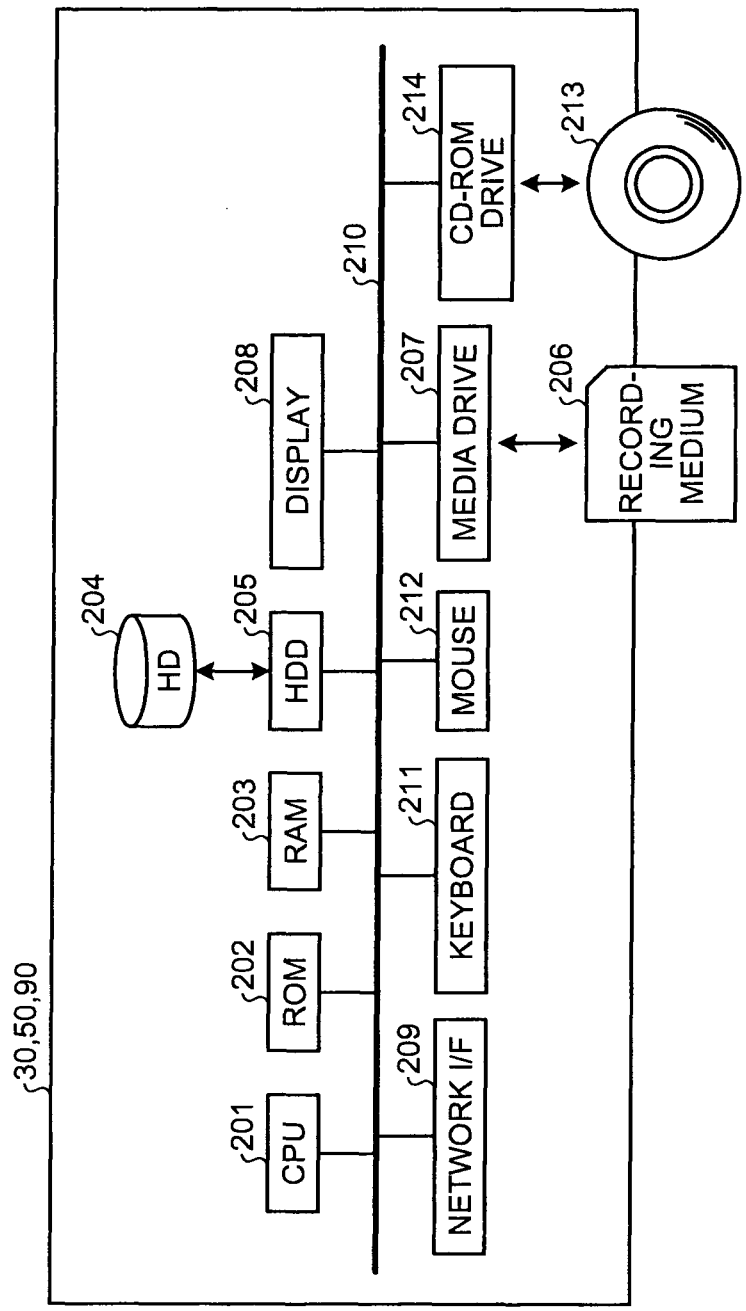
FIG. 6 is a schematic illustrating a hardware structure of a transmission management apparatus, a relaying apparatus, or a program supply apparatus.

As illustrated in FIG. 6, the transmission management apparatus 50 includes a CPU 201 that controls the overall operation of the transmission management apparatus 50, a ROM 202 that stores therein a program used to drive the CPU 201 such as an IPL, a RAM 203 that is used as a working area of the CPU 201, the HD 204 that stores therein various types of data such as the transmission management program, an HDD (Hard Disk Drive) 205 that controls reading of various types of data from or writing of various types of data into the HD 204 under the control of the CPU 201, a media drive 207 that controls reading data from or writing (storing) data into a recording medium 206 such as a flash memory, a display 208 that displays various types of information such as a cursor, menus, windows, characters, or images, a network I/F 209 that performs data transfer by utilizing the transmission network 2, a keyboard 211 provided with a plurality of keys for inputting characters, numerical values, and various instructions, a mouse 212 that is used to select and execute various instructions, select items to be processed, and move the cursor, a compact disc read only memory (CD-ROM) drive 214 that controls reading of various types of data from or writing of various types of data into a CD-ROM 213 as an example of an attachable-detachable recording medium, and a bus line 210 that electrically connects the above-described components, such as an address bus or a data bus.

The transmission management program may be recorded into a computer readable recording medium such as the recording medium 206 and the CD-ROM 213 in an installable format or an executable format and distributed. The transmission management program may be stored in the ROM 202 instead of the HD 204.

The relaying apparatus 30 has the same hardware structure as that of the transmission management apparatus 50. The description thereof is, thus, omitted. The HD 204 stores therein the relaying apparatus program that controls the relaying apparatus 30.

Also in this case, the relaying apparatus program may be recorded into a computer readable recording medium such as the recording medium 206 and the CD-ROM 213 in an installable format or an executable format and distributed. The relaying apparatus program may be stored in the ROM 202 instead of the HD 204.

The program supply apparatus 90 has the same hardware structure as that of the transmission management apparatus 50. The description thereof is, thus, omitted. The HD 204 stores therein a program supply apparatus program that controls the program supply apparatus 90.

Also in this case, the program supply apparatus program may be recorded into a computer readable recording medium such as the recording medium 206 and the CD-ROM 213 in an installable format or an executable format and distributed. The program supply apparatus program may be stored in the ROM 202 instead of the HD 204.

As the above-described computer readable recording medium, a compact disc recordable (CD-R), a digital versatile disk (DVD), or a Blue-ray disc is applicable, for example.

<<Functional Structure of Embodiment>>

Figure 7:
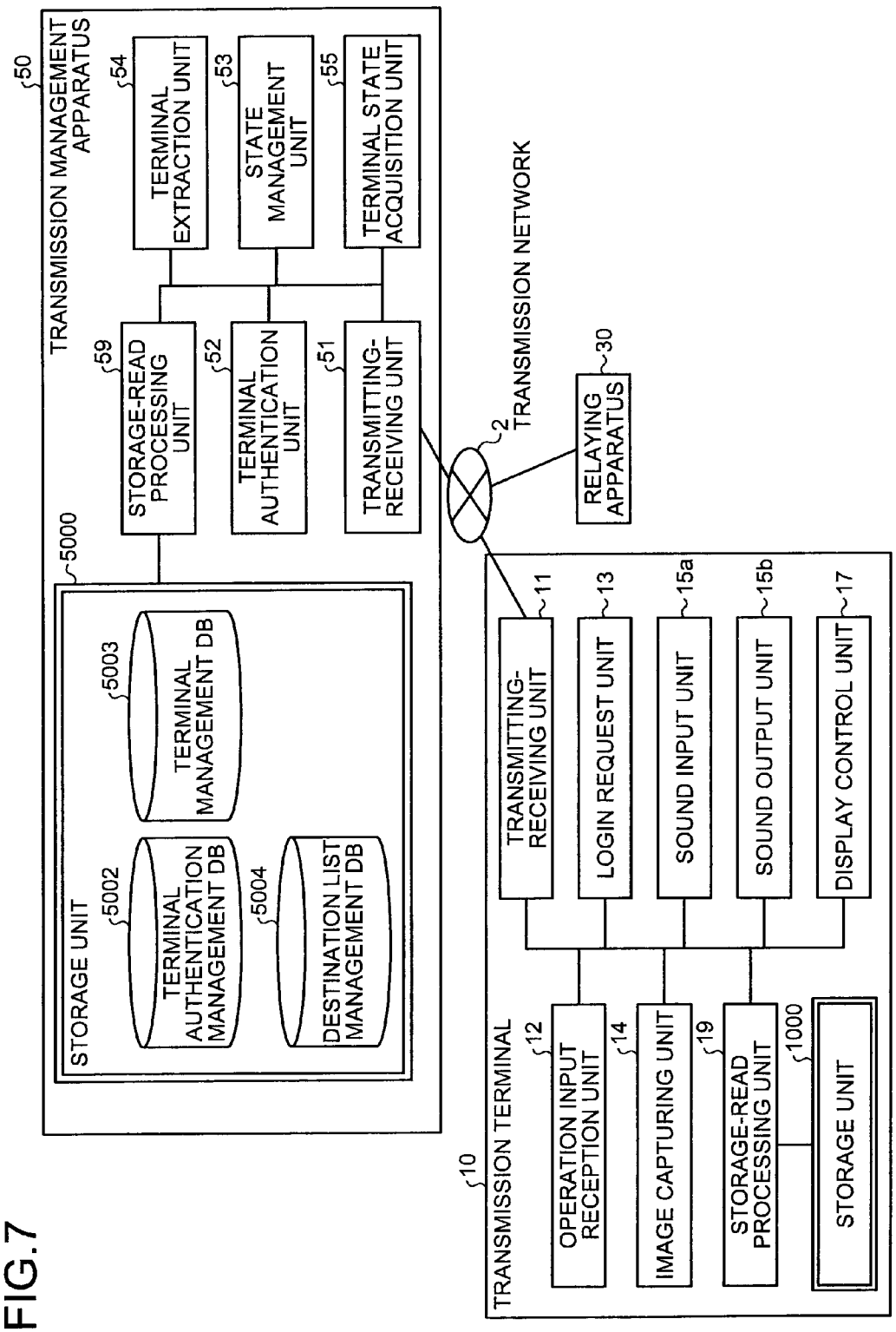
FIG. 7 is a functional block diagram of the transmission terminal and the transmission management system.

As illustrated in FIG. 7, the transmission terminal 10, the relaying apparatus 30, and the transmission management apparatus 50 are coupled such that they can transmit data through the transmission network 2. The program supply apparatus 90 illustrated in FIG. 1 is omitted in FIG. 7 because the program supply apparatus 90 does not directly relate to data transmission in a video conference.

<Functional Structure of Transmission Terminal>

The transmission terminal 10 includes a transmitting-receiving unit 11, an operation input reception unit 12, a login request unit 13, an image capturing unit 14, a sound input unit 15a, a sound output unit 15b, a display control unit 17, and a storage-read processing unit 19. The above-described components are achieved by the CPU 101 that executes the transmission terminal control program loaded on the RAM 103 from the flash memory 104. The transmission terminal 10 includes a storage unit 1000 that is structured by the RAM 103 and the flash memory 104.

Functional Structures of Transmission Terminal

The transmitting-receiving unit 11, which is achieved by the CPU 101 and the network I/F 111, transmits and receives various types of data and information between itself and other transmission terminals 10 or the apparatuses 30, 50, and 90 through the transmission network 2. The transmitting-receiving unit 11 functions as the transmitting unit and the receiving unit of the transmission terminal 10.

The transmitting-receiving unit 11 starts receiving state information indicating the states of the transmission terminals 10 that are candidates of a connecting destination in a video conference from the transmission management apparatus 50 before starting the video conference with a desired destination terminal.

The state information indicates not only an operation state of whether each transmission terminal 10 is online or offline but also a detailed operation state such as whether each transmission terminal 10 is online and transmission is enabled or whether each transmission terminal 10 is online and in a transmission operation.

In addition, the state information indicates not only the operation state of each transmission terminal 10 but also various states in the transmission terminal 10. For example, a state in which the cable 120c is come off from the transmission terminal 10, a state in which the transmission terminal 10 outputs sounds but no images, and a state in which the transmission terminal 10 outputs no sounds (MUTE). For easy understanding, a case is described in which the state information indicates the operation state of each transmission terminal 10, in the following descriptions.

The operation input reception unit 12, which is achieved by the CPU 101, the operation button 108, and the power switch 109, receives various types of inputs from a user. For example, once a user turns on the power switch 109, the operation input reception unit 12 receives the power ON operation and causes the power supply of the transmission terminal 10 to be turned on.

The login request unit 13, which is achieved by the CPU 101, once the power ON operation is received, transmits login request information indicating a request for login and the current IP address of the transmission terminal 10 to the transmission management apparatus 50 from the transmitting-receiving unit 11 through the transmission network 2.

When the user switches the power switch 109 from the ON state to the OFF state, the operation input reception unit 12 completely turns off the power supply of the transmission terminal 10 after the transmitting-receiving unit 11 transmits the state information indicating that the power supply is to be turned off to the transmission management apparatus 50. As a result, the transmission management apparatus 50 can grasp the fact that the power supply of the transmission terminal 10 has been turned off from the ON state.

The image capturing unit 14, which is achieved by the CPU 101, the camera 112, and the image capturing device I/F 113, images a subject and outputs the resulting image data to the transmitting-receiving unit 11. The camera 112 functions as an imaging apparatus and the image capturing device I/F 113 functions as an image data input unit.

The sound input unit 15a, which is achieved by the CPU 101 and the sound input-output I/F 116, functions as a sound data input unit. The sound input unit 15a, to which a sound signal representing a sound collected by the microphone 114 is input, converts the received sound signal into sound data.

The sound output unit 15b, which is achieved by the CPU 101 and the sound input-output I/F 116, converts sound data into a sound signal and outputs the converted sound signal to the speaker 115 so as to cause the speaker 115 to output a sound.

The display control unit 17, which is achieved by the CPU 101 and the display I/F 117, combines pieces of image data that have different resolutions and are received by the transmitting-receiving unit 11, and transmits the combined image data to the display 120 so as to cause the display 120 to display an image represented by the image data thereon.

The display control unit 17 transmits information relating to a destination list received by the transmitting-receiving unit 11 from the transmission management apparatus 50 to the display 120 so as to cause the display 120 to display the destination list thereon.

The storage-read processing unit 19, which is achieved by the CPU 101 and the SSD 105, stores various types of data in the storage unit 1000 and reads various types of data stored in the storage unit 1000.

The storage unit 1000 stores therein an identifier (hereinafter referred to as a "terminal ID") and a password for identifying the transmission terminal 10, for example. In addition, the storage unit 1000 is also used as a receiving buffer for image data and sound data that are received when a video conference is held with a destination terminal.

The terminal ID in the embodiment indicates information used to uniquely identify the transmission terminal 10, such as languages, characters, symbols, or various signs. The terminal ID may be information obtained by combining at least two of the languages, characters, symbols, and various sings.

<Functional Structure of Transmission Management Apparatus>

The transmission management apparatus 50 includes a transmitting-receiving unit 51, a terminal authentication unit 52, a state management unit 53, a terminal extraction unit 54, a terminal state acquisition unit 55, and a storage-read processing unit 59. The above-described components are achieved by the CPU 201 that executes the transmission management program loaded on the RAM 203 from the HD 204. The transmission management apparatus 50 includes a storage unit 5000 composed of the HD 204.

Terminal Authentication Management Table

Figure 8:
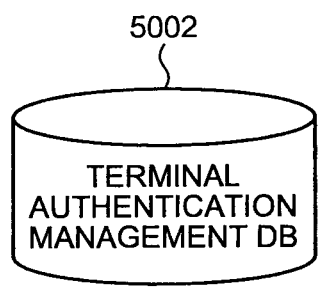
FIG. 8 is a conceptual view of a terminal authentication management table.

In the storage unit 5000, a terminal authentication management DB 5002 having a terminal authentication management table illustrated in FIG. 8 is structured. In the terminal authentication management table, passwords are managed in association with the respective terminal IDs of all of the transmission terminals 10 managed by the transmission management apparatus 50. For example, the terminal authentication management table illustrated in FIG. 8 indicates that the terminal ID of the transmission terminal 10aa is "01aa" and the password of the transmission terminal 10aa is "aaaa".

Terminal Management Table

In the storage unit 5000, a terminal management DB 5003 having a terminal management table illustrated in FIG. 9 is structured. The terminal management DB 5003 functions as a terminal management table storage unit.

In the terminal management table, an identification name of the transmission terminal 10 (hereinafter referred to as a "terminal name"), an operation state of the transmission terminal 10, a receiving date at which the login request information to login the transmission system 1 is received by the transmission management apparatus 50, and the IP address of the transmission terminal 10 are managed in association with each other for each terminal ID of the transmission terminals 10.

For example, the terminal management table illustrated in FIG. 9 indicates that the terminal name is "AA terminal, Tokyo business office, Japan", the operation state is "online (transmission is enabled)", the data at which the login request information was received by the transmission management apparatus 50 is "13:40 on Nov. 10, 2009", and the IP address is "1.2.1.3" for the transmission terminal 10aa having the terminal ID of "01aa".

The terminal ID of the terminal management table is uniquely allocated when the transmission terminal 10 is registered in the transmission system 1. The terminal name is registered or changed by an administrator of the transmission management apparatus 50. The terminal name may be registered or changed in response to a request made from the transmission terminal 10 to the transmission management apparatus 50.

The operation state of "online (transmission is enabled)" indicates that the transmission terminal 10 has logged in the transmission system 1 but is not attending a video conference. The operation state of "online (in transmission)" indicates that the transmission terminal 10 has logged in the transmission system 1 and is attending a video conference. The operation state of "offline" indicates that the transmission terminal 10 has not logged in the transmission system 1.

Destination List Management Table

Furthermore, in the storage unit 5000, a destination list management DB 5004 having a destination list management table illustrated in FIG. 10 is structured. The destination list management DB 5004 functions as a destination list management table storage unit.

In the destination list management table, all of the terminal IDs of the destination terminals registered as the candidates of the destination terminal are managed in association with the terminal ID of the request source terminal that requests a start of a video conference.

For example, the destination list management table illustrated in FIG. 10 indicates that the candidates of the destination terminal to which the transmission terminal 10aa having the terminal ID of "01aa" requests a start of a video conference are the transmission terminal 10ab having the terminal ID of "01ab", the transmission terminal 10ba having the terminal ID of "01ba", and the transmission terminal 10db having the terminal ID of "01db". The candidate of the destination terminal is added or deleted in response to a request made from the transmission terminal 10 to the transmission management apparatus 50.

Functional Structures of Transmission Management Apparatus

The transmitting-receiving unit 51, which is achieved by the CPU 201 and the network I/F 209, transmits and receives various types of data and information between itself and other transmission terminals 10 or the apparatuses 30 and 90 through the transmission network 2.

The terminal authentication unit 52, which is achieved by the CPU 201, searches the terminal authentication management DB 5002 of the storage unit 5000 by using the terminal ID and the password that are included in the login request information received through the transmitting-receiving unit 51 as searching keys, and performs terminal authentication by determining whether the same terminal ID and password are managed in the terminal authentication management DB 5002.

The state management unit 53, which is achieved by the CPU 201, stores the operation state, the receiving date at which the transmission management apparatus 50 has received the login request information, and the IP address in the terminal management DB 5003 (refer to FIG. 9) and manages them in association with the terminal ID of the request source terminal so as to manage the operation state of the request source terminal that makes the login request.

The state management unit 53 changes the operation state of the transmission terminal 10 in the terminal management DB 5003 (refer to FIG. 9) from online to offline in accordance with the state information that is sent from the transmission terminal 10 and indicates that the power supply is to be turned off when a user turns off the power switch 109 of the transmission terminal 10 from the ON state.

The terminal extraction unit 54, which is achieved by the CPU 201, searches the destination list management DB 5004 (refer to FIG. 10) by using the terminal ID of the request source terminal that has made the login request as a searching key, and extracts the terminal IDs of the candidates of the destination terminal of the request source terminal.

In addition, the terminal extraction unit 54 searches the destination list management DB 5004 (refer to FIG. 10) by using the terminal ID of the request source terminal that has made the login request as a searching key, and extracts the terminal IDs of the other request source terminals that register the terminal ID of the request source terminal as the candidate of the destination terminal thereof.

The terminal state acquisition unit 55, which is achieved by the CPU 201, searches the terminal management DB 5003 (refer to FIG. 9) by using the terminal IDs of the candidates of the destination terminal extracted by the terminal extraction unit 54 as searching keys and reads the operation state for each detected terminal ID.

As a result, the terminal state acquisition unit 55 can acquire the operation states of the candidates of the destination terminal of the request source terminal that has made the login request. Furthermore, the terminal state acquisition unit 55 searches the terminal management DB 5003 by using the terminal IDs extracted by the terminal extraction unit 54 as searching keys and acquires the operation state of the request source terminal that has made the login request.

The storage-read processing unit 59, which is achieved by the CPU 201 and the HDD 205, stores various types of data in the storage unit 5000 and reads various types of data stored in the storage unit 5000.

<<Processing or Operation of Embodiment>>

Figure 11:
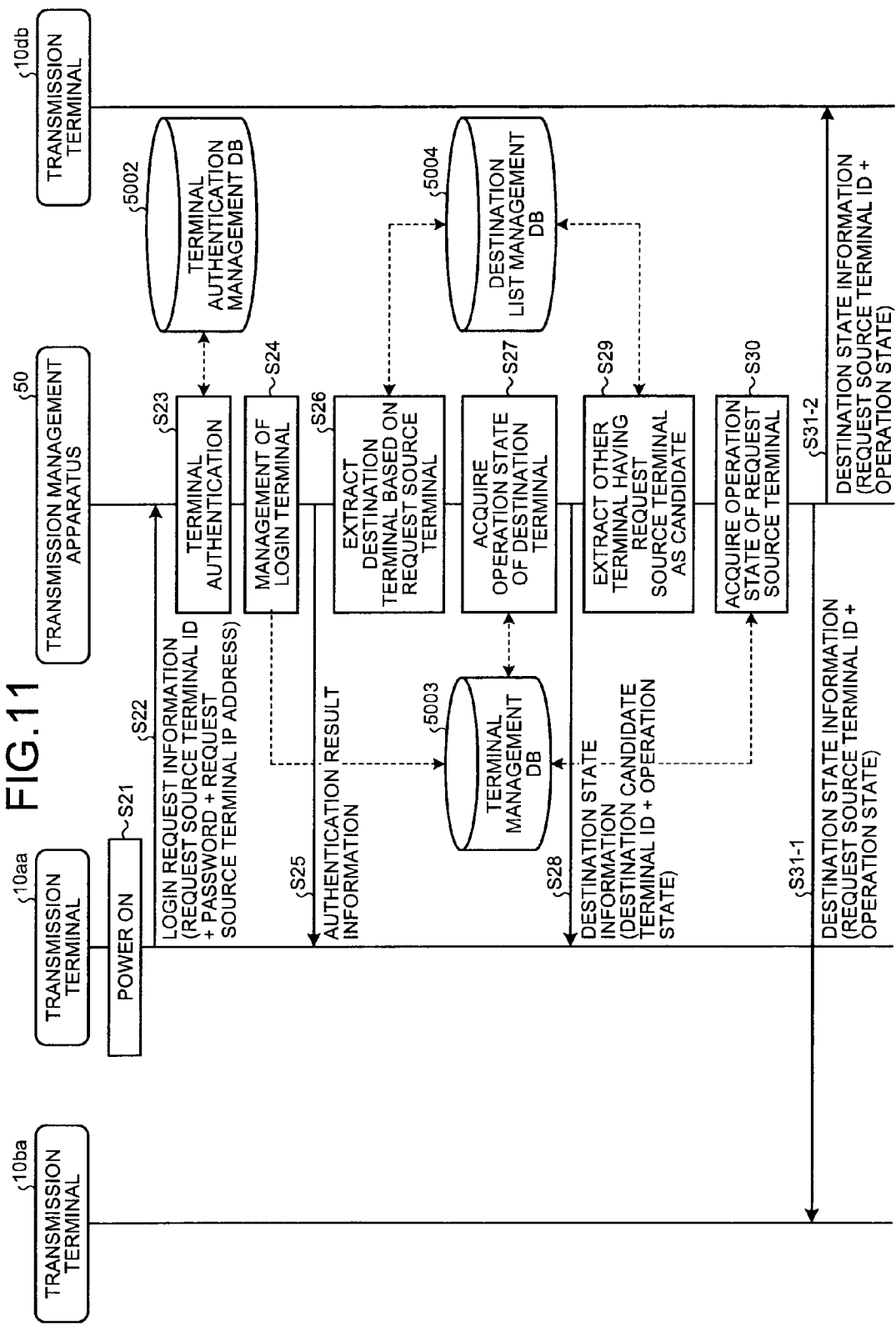
FIG. 11 is a sequence diagram illustrating preparatory stage operation of the transmission system.

Operation of the transmission system 1 according to the embodiment is described below. FIG. 11 is a sequence diagram illustrating preparatory stage operation until the transmission terminal 10 reaches a preparatory state to attend a video conference. FIG. 11 illustrates an example in which the transmission terminal 10aa reaches the preparatory state. In the preparatory stage operation, various types of information are transmitted and received in the management information session SEI (refer to FIG. 2).

When a user of the transmission terminal 10*aa* turns on the power switch 109 of the transmission terminal 10*aa*, the operation input reception unit 12 receives the power ON operation and causes the power supply to be turned on (step S21). The login request unit 13, once the power ON operation is received, transmits the login request information indicating a request for login to the transmission management apparatus 50 from the transmitting-receiving unit 11 of the transmission terminal 10*aa* through the transmission network 2 (step S22).

The login request information includes the terminal ID and the password to identify the transmission terminal 10*aa* serving as a login request source. The terminal ID and the password are read from the storage unit 1000 by the storage-read processing unit 19.

Upon receiving the login request information transmitted from the transmission terminal 10*aa*, the transmission management apparatus 50 can grasp the IP address of the transmission terminal 10*aa* serving as a transmission side.

Then, the terminal authentication unit 52 of the transmission management apparatus 50 searches the terminal authentication management DB 5002 of the storage unit 5000 (refer to FIG. 8) by using the terminal ID and the password that are included in the login request information received through the transmitting-receiving unit 51 as searching keys, and performs terminal authentication by determining whether the same terminal ID and password as the searching keys are managed in the terminal authentication management DB 5002 (step S23).

If the terminal authentication unit 52 determines that the same terminal ID and password as the searching keys are not managed, i.e., if it is determined that the login request is not transmitted from the transmission terminal 10 having use authority, the transmitting-receiving unit 51 transmits authentication result information indicating the authentication result obtained by the terminal authentication unit 52 to the transmission terminal 10*aa* that has made the login request through the transmission network 2. Thereafter, the operation of the preparatory stage ends.

On the other hand, if the terminal authentication unit 52 determines that the same terminal ID and password as the searching keys are managed, i.e., it is determined that the login request is transmitted from the transmission terminal 10 having use authority, the state management unit 53 stores the terminal ID, the operation state, the receiving date of the login request information, and the IP address of the transmission terminal 10*aa* in the terminal management DB 5003 (refer to FIG. 9) in association with one another (step S24).

As a result, as illustrated in FIG. 9, the terminal management table manages the terminal ID "01aa", the operation state "online (transmission is enabled)", the receiving date "13:40 on Nov. 10, 2009", and the IP address "1.2.1.3" of the transmission terminal 10*aa* in association with one another.

Then, the transmitting-receiving unit 51 of the transmission management apparatus 50 transmits the authentication result information indicating the authentication result obtained by the terminal authentication unit 52 to the transmission terminal 10*aa* that has made the login request through the transmission network 2 (step S25).

Then, the terminal extraction unit 54 of the transmission management apparatus 50 searches the destination list management DB 5004 (refer to FIG. 10) by using the terminal ID "01aa" of the transmission terminal 10*aa* that has made the login request as a searching key, and extracts the terminal IDs of the candidates of the destination terminal of the transmission terminal 10*aa* (step S26).

In this case, the terminal IDs "01ab", "01ba", and "01db" of the transmission terminals 10*ab*, 10*ba*, and 10*db* that are the destination terminals of the terminal ID "01aa" of the transmission terminal 10*aa* are extracted.

Then, the terminal state acquisition unit 55 of the transmission management apparatus 50 searches the terminal management DB 5003 (refer to FIG. 9) by using the terminal IDs "01ab", "01ba", and "01db" of the candidates of the destination terminal extracted by the terminal extraction unit 54 as searching keys and reads the operation states of the terminal IDs extracted by the terminal extraction unit 54 as "offline", "online (transmission is enabled)", and "online (in transmission)". As a result, the terminal state acquisition unit 55 acquires the respective operation states of the transmission terminals 10*ab*, 10*ba*, and 10*db* (step S27).

Then, the transmitting-receiving unit 51 of the transmission management apparatus 50 transmits, to the transmission terminal 10*aa* through the transmission network 2, the terminal IDs "01ab", "01ba", and "01db" used as the searching keys at step S27, and the destination state information including the operation states of the respective transmission terminals 10*ab*, 10*ba*, and 10*db* corresponding to the respective terminal IDs, which are "offline", "online (transmission is enabled)", and "online (in transmission)" (step S28).

As a result, the transmission terminal 10*aa* can grasp the current operation states, each of which is "offline", "online (transmission is enabled)", and "online (in transmission)", of the transmission terminals 10*ab*, 10*ba*, and 10*db* that are the candidates of the destination terminal.

Furthermore, the terminal extraction unit 54 of the transmission management apparatus 50 searches the destination list management DB 5004 (refer to FIG. 10) by using the terminal ID "01aa" of the transmission terminal 10*aa* that has made the login request as a searching key, and extracts the terminal IDs of the other transmission terminals that register the terminal ID "01aa" of the transmission terminal 10*aa* as the candidate of the destination terminal (step S29). For example, in the destination list management table illustrated in FIG. 10, the terminal IDs "01ab", "01ba", and "01db" are extracted.

Then, the state management unit 53 of the transmission management apparatus 50 searches the terminal management DB 5003 (refer to FIG. 9) by using the terminal ID "01aa" of the transmission terminal 10*aa* that has made the login request as a searching key and acquires the operation state, which is "online (transmission is enabled)", of the transmission terminal 10*aa* that has made the login request (step S30).

Then, the transmitting-receiving unit 51 of the transmission management apparatus 50 transmits destination state information including the terminal ID "01aa" of the transmission terminal 10*aa* and the operation state "online (transmission is enabled)" that are acquired at step S30 to the transmission terminals 10*ba* and 10*db* each operation state of which is "online" in the terminal management DB 5003 (refer to FIG. 9) among the transmission terminals 10*ab*, 10*ba*, and 10*db* that are identified with the terminal IDs "01ab", "01ba", and "01db" extracted at step S29 (step S31-1 and step S31-2).

When transmitting the destination state information to the transmission terminals 10*ba* and 10*db*, the transmitting-receiving unit 51 refers to the IP addresses of the transmission terminals managed in the terminal management table illustrated in FIG. 9 using the terminal IDs "01ba" and "01db".

As a result, the terminal ID "01aa" and the operation state "online (transmission is enabled)" of the transmission terminal 10*aa* that has made the login request can be transmitted to the transmission terminals 10*db* and 10*ba* that can perform transmission to the transmission terminal 10*aa* that has made the login request as the destination.

When step S28 of the preparatory stage operation is complete, the display control unit 17 of the transmission terminal 10aa highlights, on the display 120, the information of the terminals attending the video conference, i.e., the transmission terminal 10db operation state of which is "online (in transmission)" or "online (transmission is enabled)", from the information of the destination list displayed on the display 120, for example. As a result, the display control unit 17 allows a user to recognize the transmission terminal 10 attending or capable of attending the video conference.

Figure 12:
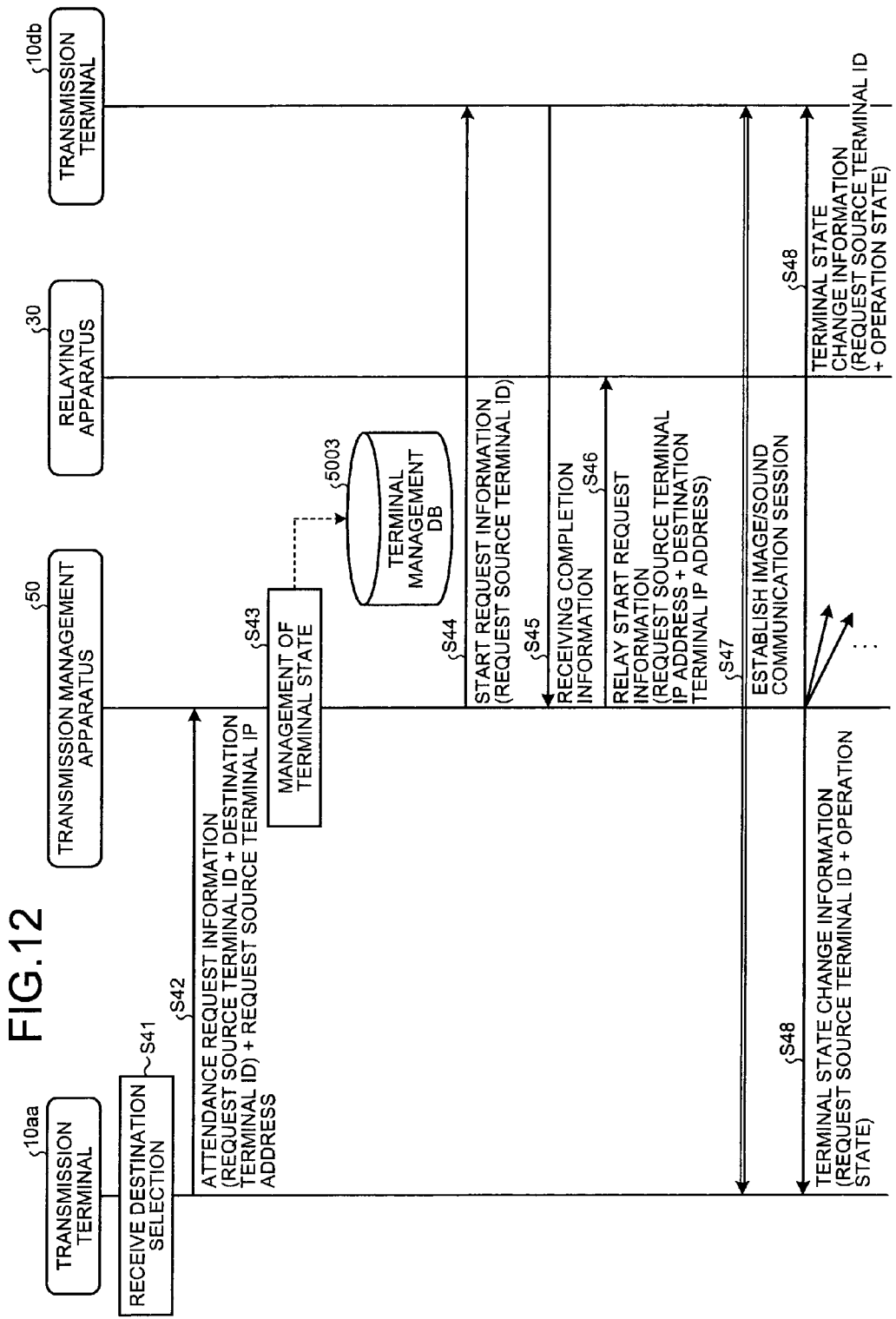
FIG. 12 is a sequence diagram illustrating conference attendance operation of the transmission system.

FIG. 12 is a sequence diagram illustrating conference attendance operation until the transmission terminal 10 reaches an attendance state in which the transmission terminal 10 is attending a video conference. FIG. 12 illustrates an example in which the transmission terminal 10aa reaches the attendance state. In the conference attendance operation, various types of information are transmitted and received in the management information session SEI (refer to FIG. 2).

Once a user presses the operation button 108 to select an attendance at a video conference, the operation input reception unit 12 receives a request for an attendance at the video conference held with the transmission terminal 10db (step S41).

In response to the request, the transmitting-receiving unit 11 of the transmission terminal 10aa transmits attendance request information indicating the attendance at the video conference and including the terminal ID "01aa" of the transmission terminal 10aa and the terminal ID "01db" of the transmission terminal 10db to the transmission management apparatus 50 (step S42).

As a result, the transmitting-receiving unit 51 of the transmission management apparatus 50 receives the attendance request information and can confirm the IP address "1.2.1.3" of the transmission terminal 10aa serving as a transmission source.

Then, the state management unit 53 of the transmission management apparatus 50 searches by using the terminal ID "01aa" of the transmission terminal 10aa included in the attendance request information as a searching key and sets "online (in transmission)" as the operation state of the transmission terminal 10aa that has made the attendance request (step S43).

Then, the transmitting-receiving unit 51 of the transmission management apparatus 50 transmits start request information including the terminal ID "01aa" of the transmission terminal 10aa to the transmission terminal 10db though the transmission network 2 (step S44). As a result, the transmission terminal 10db can grasp which transmission terminal 10 has requested the attendance at the video conference.

In the terminal management DB 5003 illustrated in FIG. 9, the operation state of the transmission terminal 10cb is "online (in transmission)". Accordingly, the transmitting-receiving unit 51 of the transmission management apparatus 50 transmits the start request information including the terminal ID "01aa" of the transmission terminal 10aa to the transmission terminal 10cb through the transmission network 2. Detailed description thereof is, however, omitted herein for easy understanding of the invention.

Then, the transmission terminal 10db transmits receiving completion information indicating the completion of the receiving of the start request information to the transmission management apparatus 50 from the transmitting-receiving unit 11 through the transmission network 2 (step S45).

Then, the transmitting-receiving unit 51 of the transmission management apparatus 50 transmits relay start request information indicating a request for starting a relay to the relaying apparatus 30 through the transmission network 2 (step S46). The relay start request information includes the IP address "1.2.1.3" of the transmission terminal 10aa and the IP address "1.3.2.4" of the transmission terminal 10db.

As a result, the relaying apparatus 30 establishes a session for transmitting three pieces of image data of low resolution, medium resolution, and high resolution and sound data between the transmission terminals 10aa and 10db (step S47). In this way, the transmission terminal 10aa can attend the video conference held with the transmission terminal 10db.

Meanwhile, the transmitting-receiving unit 51 of the transmission management apparatus 50 casts terminal state change information including the terminal ID "01aa" and the operation state "online (in transmission)" of the transmission terminal 10aa into each transmission terminal 10 registered in the terminal management DB 5003 (refer to FIG. 9) (step S48). As a result, each transmission terminal 10 having received the terminal state change information can store and display the operation state of the transmission terminal 10aa having the terminal ID "01aa" if needed.

Figure 13:
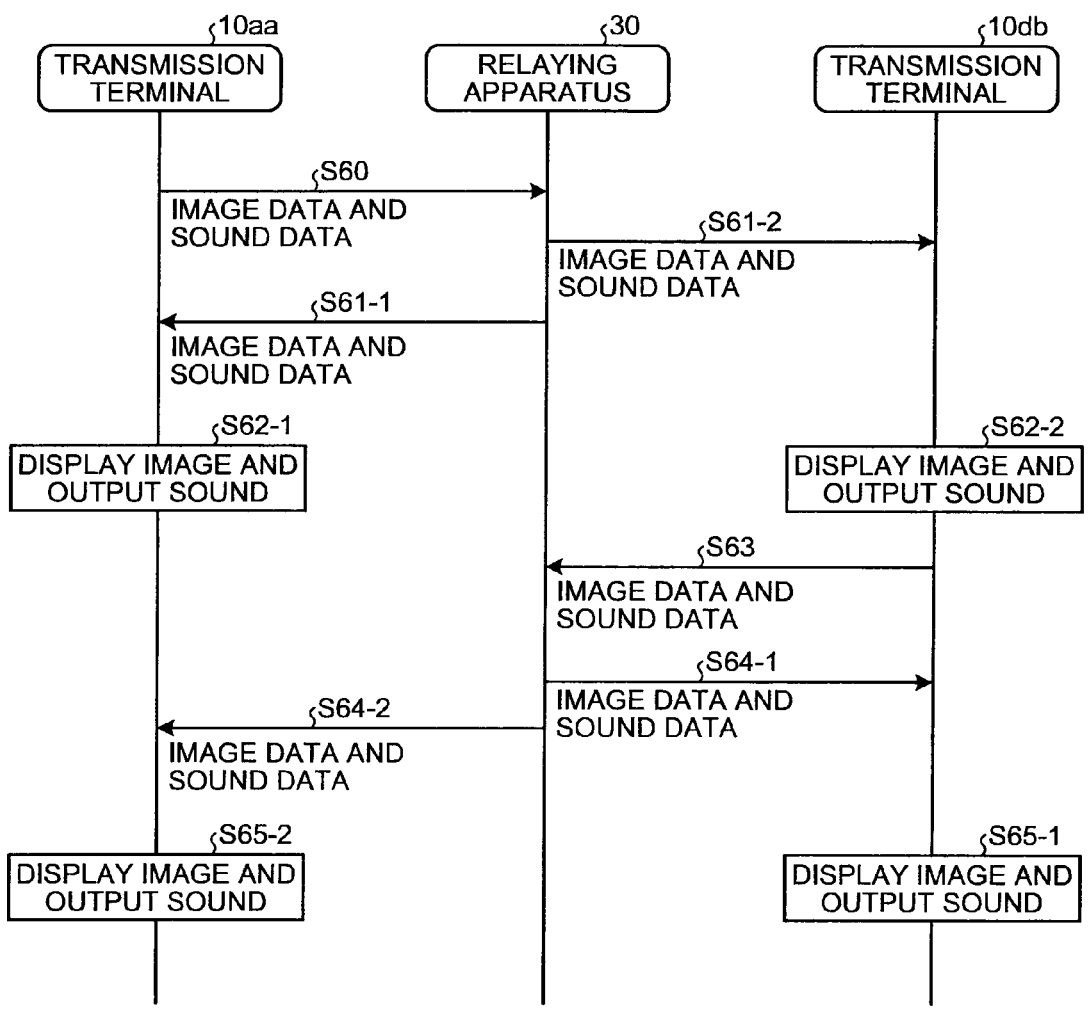
FIG. 13 is a sequence diagram illustrating data transmission operation of the transmission system.

FIG. 13 is a sequence diagram illustrating data transmission operation between the transmission terminals 10. In the data transmission operation illustrated in FIG. 13, image data and sound data are transmitted and received in the image/sound data session SED (refer to FIG. 2).

Once the session is established between the transmission terminals 10aa and 10db as described with reference to FIG. 12, the transmission terminal 10aa transmits, to the relaying apparatus 30 through the transmitting-receiving unit 51, the image data taken by the image capturing unit 14 and sound data into which the sound input unit 15a converts a received sound signal (step S60).

Upon receiving the image data and the sound data from the transmission terminal 10aa, the relaying apparatus 30 transmits the received image data and sound data to each of the transmission terminals 10aa and 10db that are attending the video conference (step S61-1 and step S61-2).

Upon receiving the image data and the sound data from the relaying apparatus 30, each of the transmission terminals 10aa and 10db allows the display control unit 17 to cause the display 120 to display the image represented by the received image data and allows the sound output unit 15b to cause the speaker 115 to output the sound represented by the received sound data (step S62-1 and step S62-2).

Then, the transmission terminal 10db transmits, to the relaying apparatus 30 through the transmitting-receiving unit 51, image data taken by the image capturing unit 14 and sound data into which the sound input unit 15a converts a received sound signal (step S63).

Upon receiving the image data and the sound data from the transmission terminal 10db, the relaying apparatus 30 transmits the received image data and sound data to each of the transmission terminals 10aa and 10db that are attending the video conference (step S64-1 and step S64-2).

Upon receiving the image data and the sound data from the relaying apparatus 30, each of the transmission terminals 10aa and 10db allows the display control unit 17 to cause the display 120 to display the image represented by the received image data and allows the sound output unit 15b to cause the speaker 115 to output the sound represented by the received sound data (step S65-1 and step S65-2).

In this way, the transmission terminals 10aa and 10db can have a video conference therebetween through the relaying apparatus 30. FIG. 13 illustrates two transmission terminals 10, i.e., the transmission terminals 10aa and 10db, attending the video conference for easy understanding. Even if the number of transmission terminals 10 attending the video conference is equal to or more than three, image data and sound data are transmitted in the same manner as the data transmission operation illustrated in FIG. 13.

An image display of the transmission terminal 10 is described below. In the embodiment, the display control unit 17 has two display modes of an all-image display mode and an information display mode. Switching of the display modes is performed in accordance with operation of the operation button 108, for example.

Figures 14, 15:
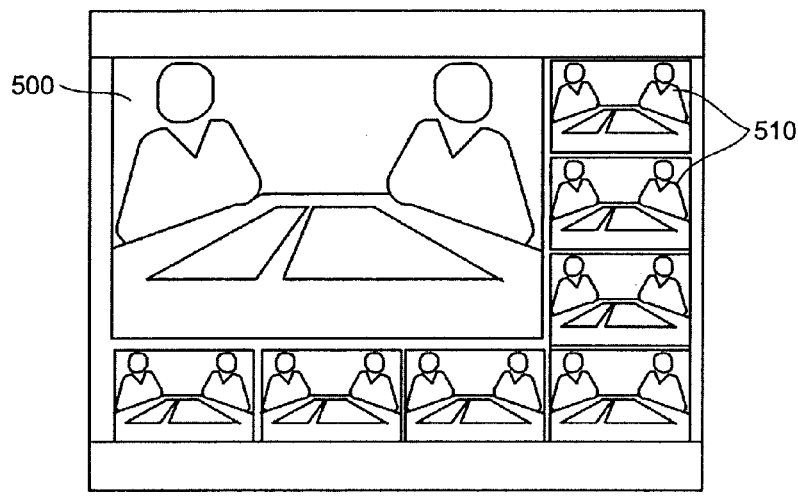
FIG. 14 is a conceptual view illustrating a display screen in an all-image display mode.
FIG. 15 is a conceptual view illustrating a display screen in an information display mode.

In the all-image display mode as illustrated in FIG. 14, the display control unit 17 of the transmission terminal 10 causes the display 120 to display all of the images transmitted from each transmission terminal 10 attending a video conference.

In the display screen illustrated in FIG. 14, a first image area 500 having a relatively large area and a plurality of second image areas 510 each having a relatively small area are allocated. For example, images represented by pieces of image data transmitted from the transmission terminals 10 attending the video conference are displayed in the second image areas 510 while an image represented by image data of a main transmission terminal among the transmission terminals 10 attending the video conference is displayed in the first image area 500.

For example, the display control unit 17 specifies a transmission terminal that is the transmission source of sound data representing the voice in the received sound data as a major terminal among the transmission terminals 10 attending the video conference. A voice stream is detected for each piece of the received sound data. The sound data representing the voice is sound data determined that it has the voice stream. The detection of the voice stream can be achieved by using known techniques (e.g., refer to NIIMI, Yasuhisa. Speech Recognition. Japan. Kyoritsu Publishing, Co. 1979. pages 68 to 72).

On the other hand, in the information display mode as illustrated in FIG. 15, the display control unit 17 of the transmission terminal 10 causes the display 120 to display terminal information including at least the terminal names and terminal IDs of the transmission terminals 10 attending the video conference.

To the display screen illustrated in FIG. 15, an image display area 520 for displaying an image and a terminal information display area 530 for displaying the terminal information are allocated. For example, in the terminal information display area 530, pieces of the terminal information of the transmission terminals 10 attending the video conference are displayed as a list.

The terminal information having no terminal name displayed among the pieces of terminal information displayed in the list represents the transmission terminal 10 that is not registered as the candidate of the destination terminal of the terminal serving as a transmission terminal in the destination list management DB 5004 (refer to FIG. 10).

For example, in the display screen illustrated in FIG. 15, the terminal name of the transmission terminal 10*db* is displayed because the transmission terminal 10*db* is registered in the destination list management DB 5004 as the candidate of the destination terminal of the transmission terminal 10*aa* while the terminal name of the transmission terminal 10*cb* is not displayed because the transmission terminal 10*cb* is not registered in the destination list management DB 5004 as the candidate of the destination terminal of the transmission terminal 10*aa*.

In the image display area 520, an image represented by image data of a major transmission terminal is displayed among the transmission terminals 10 attending the video conference. For example, the display control unit 17 specifies a transmission terminal that is the transmission source of sound data representing the voice in the received sound data, as a major transmission terminal among the transmission terminals 10 attending the video conference. The display control unit 17 may specify a selected transmission terminal as a major transmission terminal when the operation input reception unit 12 receives information indicating that a certain transmission terminal is selected among the transmission terminals 10 attending the video conference in accordance with a user's operation of the operation button 108.

Figure 16:
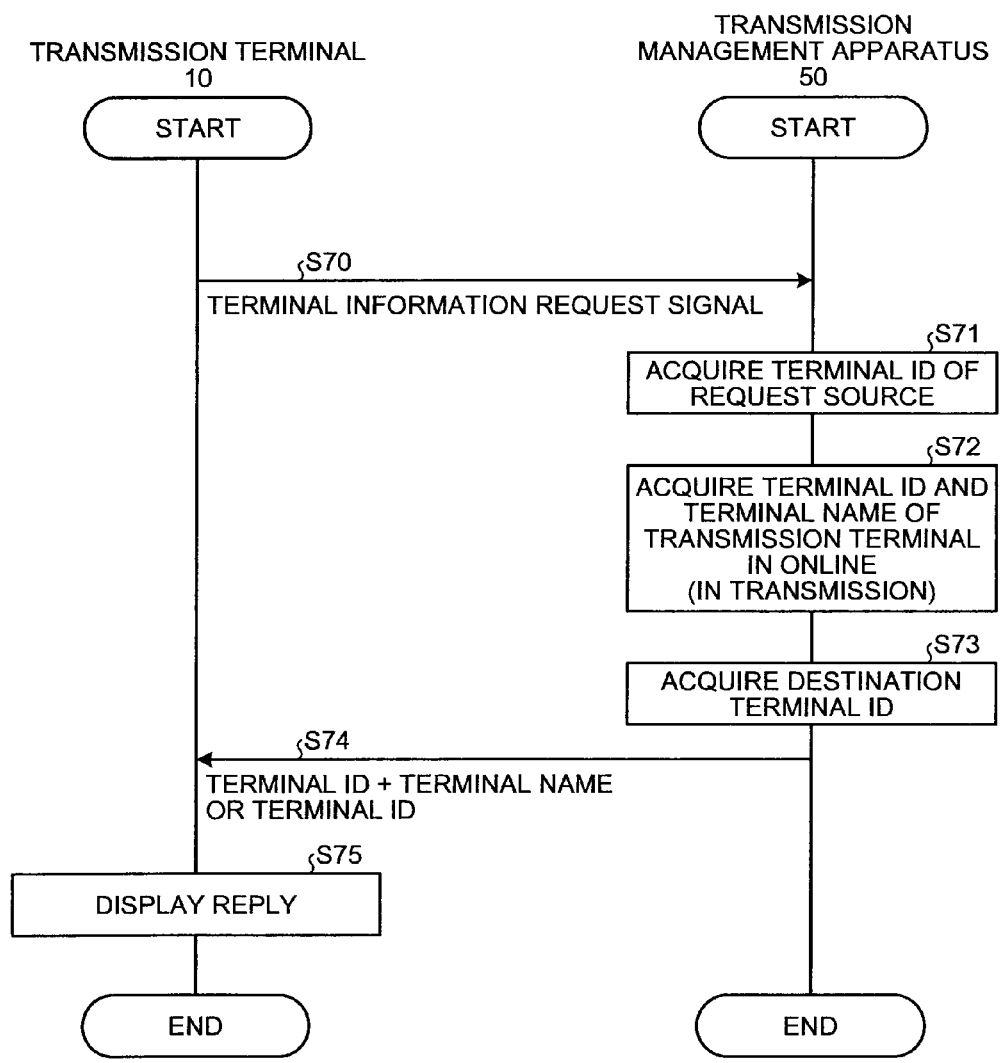
FIG. 16 is a sequence diagram illustrating terminal information display operation of the transmission system.

FIG. 16 is a sequence diagram illustrating terminal information display operation in which terminal information to be displayed in the terminal information display area 530 is displayed in the terminal information display area 530 when the display mode is switched to the information display mode in the transmission terminal 10. In the terminal information display operation illustrated in FIG. 16, various types of information are transmitted and received in the management information session SEI.

First, the transmission terminal 10 transmits a terminal information request signal indicating a request of the terminal information of the transmission terminal attending a video conference to the transmission management apparatus 50 (step S70). Upon receiving the terminal information request signal, the terminal state acquisition unit 55 of the transmission management apparatus 50 searches the terminal management DB 5003 (refer to FIG. 9) of the storage unit 5000 by using the IP address of the transmission source of the terminal information request signal as a searching key and acquires the terminal ID of the transmission terminal that transmits the terminal information request signal (step S71).

Then, the terminal state acquisition unit 55 searches the terminal management DB 5003 for the terminal ID and the terminal name with the operation condition "online (in transmission)" (step S72). In the embodiment, the terminal state acquisition unit 55 detects the terminal IDs "01aa", "01cb", and "01db". The operation state of the transmission terminal having the terminal ID "01aa" is set as "online (in transmission)" at step S43.

Then, the terminal state acquisition unit 55 searches the destination list management DB 5004 (refer to FIG. 10) of the storage unit 5000 by using the terminal ID detected at step S71 ("01aa" in the embodiment) as a searching key and acquires the terminal IDs of the candidates of the destination terminal of the transmission source of the terminal information request signal (step S73).

For example, when the terminal ID of the transmission terminal that transmits the terminal information request signal is "01aa", the terminal IDs "01ab", "01ba", and "01db" are acquired by the terminal state acquisition unit 55.

Then, the terminal state acquisition unit 55 determines whether each of the terminal IDs acquired at step S72 is included in the terminal ID of the transmission source of the terminal information request signal or the terminal IDs acquired at step S73. If it is determined that the terminal ID is included, the terminal state acquisition unit 55 causes the transmitting-receiving unit 51 to reply the included terminal ID and the terminal name to the transmission source of the terminal information request signal. If it is determined that the terminal ID is not included, the terminal state acquisition unit 55 causes the transmitting-receiving unit 51 to reply only the terminal ID to the transmission source of the terminal information request signal (step S74).

For example, when the terminal ID of the transmission terminal that transmits the terminal information request signal is "01aa", the terminal IDs "01aa" and "01db" and the terminal names "AA terminal, Tokyo business office, Japan"

and "DB terminal, Washington, D.C. business office, USA" of the transmission terminals 10aa and 10db, and the terminal ID "01cb" of the transmission terminal 10cb are transmitted to the transmission terminal 10aa that is the transmission source of the terminal information request signal.

The display control unit 17 of the transmission terminal 10 having received the reply displays the reply contents in the terminal information display area 530 as the display screen illustrated in FIG. 15 (step S75).

<<Major Effect of Embodiment>>

As described above, the transmission system 1 according to the embodiment causes the transmission management apparatus 50 to reply the information of the transmission terminals 10 attending a video conference. As a result, a user of each of the transmission terminals 10 can grasp which transmission terminal 10 is attending the video conference regardless of the number of transmission terminals 10 attending the video conference.

Accordingly, the transmission system 1 enables a user to know the other party at a video conference without requiring the user to ask the other party in conversation. As a result, time taken for the video conference can be reduced. In the transmission system 1, the terminal name of the transmission terminal that is not registered as the destination is not displayed, enabling the attendance of an unknown party at the video conference to be informed. As a result, the video conference can proceed with careful attention to discussion contents.

In the transmission system 1, image data of a major transmission terminal remains displayed even when terminal information is displayed on the display 120. As a result, a user can grasp a situation of a site that currently leads the video conference.

Supplemental Explanation of Embodiment

The relaying apparatus 30, the transmission management apparatus 50, and the program supply apparatus 90 in the embodiment may be structured by a single computer. The units (function or means) of them may be divided and the divided units may be structured by a plurality of computers each allocated for any unit.

When the program supply apparatus 90 is structured by a single computer, a program transmitted by the program supply apparatus 90 may be transmitted as a plurality of divided modules or transmitted without being divided.

When the program supply apparatus 90 is structured by a plurality of computers, a program may be transmitted from the computers as a plurality of divided modules.

The recording medium, such as CD-ROM, in which the transmission terminal control program, the relaying apparatus program, and the transmission management program of the embodiment are stored, the HD 204 that stores therein the programs, and the program supply apparatus 90 including the HD 204 are used as program products when the transmission terminal control program, the relaying apparatus program, and the transmission management program are provided to a user and the like domestically or overseas.

As an example of quality of an image represented by image data relayed by the relaying apparatus 30, attention is paid on the resolution of the image represented by the image data and the resolution is managed. The image quality is not limited to the resolution. As other examples of quality, attention may be paid on depth of image quality of the image represented by the image data, a sampling frequency of sound in sound data, and a bit length of sound in sound data and the quality may be managed. Sound data may be transmitted and received by being divided into three pieces of data having different resolutions (high resolution, medium resolution, and low resolution).

In FIG. 9, the IP address of the transmission terminal 10 is managed. However, the item to be managed is not limited to the IP address. Any information can be used as long as it can be used to identify the transmission terminal 10 on the transmission network 2. For example, a fully qualified domain name (FQDN) of the transmission terminal 10 may be managed. In this case, the IP address corresponding to the FQDN is acquired by a known domain name system (DNS) server.

In the embodiment, the video conference system is described as an example of the transmission system 1. However, the transmission system 1 is not limited to be applied to the video conference system. The transmission system 1 may be applicable to a telephone system such as an Internet Protocol (IP) telephone and an Internet telephone.

The transmission system 1 may be a car navigation system. In this case, the transmission terminal 10 on one side corresponds to a car navigation system mounted on a vehicle while the transmission terminal 10 on the other side corresponds to a management terminal or a management server of a management center that manages the car navigation, or another car navigation system mounted on another vehicle. In the transmission system 1, the transmission terminals 10 may be structured with cell phones.

In the embodiment, image data and sound data are described as examples of the content data. However, content data is not limited to the image data and the sound data. Touch data may be applicable. In this case, a sense of touch obtained by a user at a transmission terminal on one side is transmitted to another transmission terminal on the other side.

The content data may be olfactory (smell) data. In this case, an aroma (smell) at a transmission terminal on one side is transmitted to another transmission terminal on the other side. The content data may be at least one piece of image data, sound data, touch data, and olfactory data.

In the embodiment, the video conference is held by using the transmission system 1. However, the transmission system 1 is not limited to be used for the video conference. The transmission system 1 may be used for general conversations among family members or friends or information supply in one direction.

As described above, the embodiment enables users who use the respective transmission terminals to grasp which transmission terminal is attending a conference regardless of the number of transmission terminals attending the conference.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A transmission management apparatus for managing transmission states of a plurality of transmission terminals, the transmission management apparatus comprising:
  a memory configured to store a transmission state of each transmission terminal of the plurality of transmission terminals in association with information identifying the transmission terminal;
  a receiver configured to receive a terminal information request from one transmission terminal that is currently in a communication transmission state through an established session with a second transmission terminal from among the plurality of transmission terminals, the terminal information request indicating a request for information for identifying the second transmission terminal that is currently in a communication transmission state with the one transmission terminal;

processing circuitry configured to acquire the information for identifying the second transmission terminal based on the transmission states stored by the memory in response to receiving the terminal information request; and a transmitter configured to transmit the information acquired by the processing circuitry to the one transmission terminal.

2. The transmission management apparatus according to claim 1, further comprising a destination list management table memory configured to store therein a destination list management table in which a destination list including identifiers of the transmission terminals that have been already registered is stored for each of the transmission terminals, wherein the processing circuitry acquires, if the identifier of the at least one of the other transmission terminals is registered in the destination list for the one transmission terminal, the identifier and the identification name of the at least one of the other transmission terminals and the identifier of the transmission terminal that is not registered in the destination list of the one transmission terminal from the terminal management table in response to the terminal information request.

3. A transmission system, comprising:

a plurality of transmission terminals; and a transmission management apparatus configured to manage transmission states of the transmission terminals, wherein the transmission management apparatus includes a memory configured to store a transmission state of each transmission terminal of the plurality of transmission terminals in association with information identifying the transmission terminal, a receiver configured to receive a terminal information request from one transmission terminal that is currently in a communication transmission state through an established session with a second transmission terminal from among the plurality of transmission terminals, the terminal information request indicating a request for information for identifying the second transmission terminal that is currently in a communication transmission state with the one transmission terminal, processing circuitry configured to acquire the information for identifying the second transmission terminal based on the transmission states stored by the memory in response to receiving the terminal information request, and a transmitter configured to transmit the information acquired by the processing circuitry to the one transmission terminal, and each of the transmission terminal includes a transmitter configured to transmit the terminal information request indicating the request for information for identifying at least one of the transmission terminals to the transmission management apparatus, the transmission terminal and the at least one of the transmission terminals being in communication transmission therebetween, a receiver configured to receive the information transmitted from the transmission management apparatus in response to the terminal information request, and a display controller configured to cause a display to display the information received by the receiver.

4. A transmission management method for managing transmission states of a plurality of transmission terminals using a transmission management apparatus, the transmission management method comprising:

receiving a terminal information request from one transmission terminal that is currently in a communication transmission state through an established session with a second transmission terminal from among the plurality of transmission terminals, the terminal information request indicating a request for information for identifying the second transmission terminal that is currently in a communication transmission state with the one transmission terminal;

acquiring the information for identifying the second transmission terminal based on transmission states stored in a memory that stores a transmission state of each transmission terminal in association with information identifying the transmission terminal, in response to receiving the terminal information request; and transmitting the acquired information to the one transmission terminal.

5. A computer program product comprising a non-transitory computer-readable medium including programmed instructions, wherein the instructions, when executed by a computer included in a transmission management apparatus for managing transmission states of a plurality of transmission terminals using a transmission management apparatus, cause the computer to execute:

receiving a terminal information request from one transmission terminal that is currently in a communication transmission state through an established session with a second transmission terminal from among the plurality of transmission terminals, the terminal information request indicating a request for information for identifying the second transmission terminal that is currently in a communication transmission state with the one transmission terminal;

acquiring the information for identifying the second transmission terminal based on transmission states stored in a memory that stores a transmission state of each transmission terminal in association with information identifying the transmission terminal, in response to receiving the terminal information request; and transmitting the acquired information to the one transmission terminal.

6. The transmission management apparatus of claim 1, wherein the receiver receives the terminal information request from the one transmission terminal, while the one transmission terminal receives image data from the at least one of the other transmission terminals.

7. The transmission management apparatus of claim 1, wherein the transmitter transmits the information acquired by the processing circuitry to the one transmission terminal, which displays the information on a screen of the one transmission terminal.

* * * * *